United States Patent Office 3,051,548
Patented Aug. 28, 1962

3,051,548
PROCESS FOR TREATING ORES
CONTAINING CLAYS
William Page Wilson, Carlsbad, N. Mex., assignor to United States Borax & Chemical Corporation, Los Angeles, Calif., a corporation of Nevada
No Drawing. Filed Oct. 30, 1958, Ser. No. 770,607
4 Claims. (Cl. 23—38)

The present invention is a continuation-in-part of my application Serial No. 644,767 filed March 8, 1957, now abandoned for "Process for Treating Ores Containing Clays."

The present invention relates as indicated to a process for treating ores containing clays and has particular reference to a method for treating ores containing slime-forming clays, and which method reduces the tendency of such clays to interfere with the processing of the ores.

In the wet processing of clay containing ores, certain types of these clays tend to form slimes that interfere with the separation of values. For example, in the processing of certain sylvinite ores found in Carlsbad, New Mexico, the extraction of values becomes difficult due to the slime-forming characteristics of the clays found in these ores. Although the present invention is not necessarily limited to the treating of sylvinite ores, it will be explained with reference to them since these ores are typical of ores containing slime-forming clays.

Sylvinite ores comprise potassium chloride, sodium chloride, some minor ingredients, and the slime-forming clays. Depending upon the locality where these ores are mined, the precentage of clay varies from about 2% to about 6% of the ore body. In any wet processing of such ore the clay slimes absorb about five times their weight of potash saturated brine, which is extremely difficult or practically impossible to remove from the clay by thickening processes. The resulting large volume of clay interferes with recovery of the potash, whether the separating processing be by flotation, by heavy media separation, or by dissolution and fractional crystallization. In dissolution processing the slimes involve much time and cost for their separation by settlement and/or filtering from the solution, and in addition necessitate extra filtering apparatus in order to achieve high rates of production. The present invention, while not necessarily limited to, is primarily interested in the preparation of ores which subsequently undergo dissolution processing.

It is therefore the principal object of my invention to provide a method for minimizing at low cost the percentage of clay which goes to form slimes, to cut down the absorptive property of the clay, to eliminate red color in the solution resulting from the thermal treatment, and to minimize the equipment and cost of separating these slimes.

Other objects will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

It has been proposed in prior art methods of treating such ores as the sylvinite ore, to initially heat the ore to temperatures of from about 500° F. to about 950° F. for about ten minutes to two hours to decrepitate the ore and render its clays hard and non-dispersible so that they will not form slimes. Such decrepitation has been found successful with ores of a lower clay content on the order of about 2%; however, such heating treatment applied to the higher clay content ores does not appreciably decrepitate it.

Broadly stated, the present invention comprises a method for treating ores bearing slime-forming clays which comprises heating said ore at a temperature of from about 400° F. to about 1000° F. under reducing conditions, and then separating the clays from the ore values.

In the foregoing broadly stated paragraph it will be noted that the clay containing ores are heated in the range of 400° F. to 1000° F., which is the heating temperature known to the prior art. However, the present invention is predicated upon the discovery that completely unexpected results are obtained when the ores are heated under reducing conditions. In order to overcome the difficulties encountered by prior known methods, it is absolutely necessary that reducing conditions be maintained while the ore is subjected to the heating treatment. The reducing atmosphere can be obtained in any number of well-known methods, as, for example, the ore to be treated can be processed through a rotary kiln which is heated by a direct flame. If such method is used it is necessary that such flame be adjusted so that it is what is known to those skilled in the art as a reducing flame. This means a flame which is substantially starved for air and which flame will cause chemical reduction when the ore comes in contact with the same. If a horizontal rotary kiln is used employing a direct flame, it becomes apparent that the body of ore will remain in the kiln for a period of time. If the ore does remain in the kiln for any extended time it is necessary that the atmosphere within the kiln remain reducing. The ore then in its spiral passage through the kiln is warmed to a temperature of about 300° F. When it reaches and drops directly through the reducing flame it is directly subjected, during these drops, to the much higher flame temperature but only for a very short interval of time. For example, each drop through the reducing flame takes a time of the order of about one-fifth second; and assuming as many as fifteen drops through the flame, the total time of direct exposure to the flame is only in the order of about three seconds. Thus it will be seen that while the flame temperature may be 2000° F. or higher, the material is dropped so quickly through this flame that it is only heated on the order of from about 400 to 1000° F. It is important that the ore only remain in direct contact with the reducing flame for an extremely short period of time so that the crystal structure of the values is not melted or becomes amorphous.

When sylvinite ore is heated at temperatures in the range of from 500 to 950° F. and up, and the ore is then subjected to dissolution processing, the clay slimes go into a dispersion phase in the leaching solution and a red color persists in the solution, which in turn colors the crystals made by cooling such solution. By using the present invention wherein the ores are heated under reducing conditions, the ores when subjected to leaching solutions do not impart the objectionable pink color to the solution. In addition to the foregoing discussed horizontal rotary kiln, a vertical kiln may also be used. In this method the ore body is dropped vertically through the kiln and is substantially unheated before coming into direct contact with the heating flame. However, it is again iterated that when the ore body comes in direct contact with the flame, such flame must be a reducing flame and the ore body must remain in contact with the flame only for a very short period so that by the time it passes through the flame it has only been heated to a temperature in the order of from about 400 to 1000° F.

Still further, other methods of heating ores may be used, as, for example, a direct-fired flat-bed kiln can be used to produce the desired results. However, in this latter instance since the ore is not agitated and continuously dropped through a reducing atmosphere, it becomes necessary to provide reducing conditions in the layer of ore in addition to having a reducing flame. This can be done by any of several well-known methods, such as by admixing organic materials with the ore and then subjecting the admixture to the foregoing discussed heated treatment. If the ore is crushed and admixed with an oil and then heated the heat causes the carbonaceous material to reduce the surrounding ore body.

Additionally, other methods of providing reducing conditions can be used as by the introduction of hydrogen, carbon monoxide, etc., into the calcining kiln.

It now becomes apparent that the present invention is independent of the particular type of reducing conditions used; it only being necessary to the present invention that the ore is heated under reducing conditions.

In the preferred embodiment of my invention, I use direct contact with a reducing flame since it is the most economical way of providing reducing means for the heating of the sylvinite ore. I prefer to use a substantially horizontal kiln with a direct-fired flame which has been adjusted to a reducing flame and as the kiln rotates it drops the ore through the reducing flame and gives the desired result. I have carried on a series of tests to compare the results using my methods which comprise using reduced conditions with methods previously proposed by the prior art. In these tests identical crushed ores have been subjected (1) to heating to a substantially uniform temperature of about 564° F. for a time period of about twenty minutes; and subjected (2) to heat treatment for the same period, but involving extremely short contact with the reducing flame, with the ore discharging at the same final temperature of about 564° F. It will be noted, of course, that the direct flame used was a reducing flame. Tests on the two discharges then showed that the settling rate of clays in product 2 was faster than that of product 1, and that the percentages of clays released as slimes from product 2 was less than that released as slimes from product 1. The product of (2) when dissolved in brine solution produced a clear, water-white solution; whereas, the product of (1) when dissolved in brine solution produced the objectionable red solution. The result of my present invention is a much less expensive wet processing, requiring less equipment, than for ores treated by prior art processes.

The following example is given to illustrate the present invention in conjunction with wet processing:

Sylvinite ore is first suitably crushed and then subjected to heat treatment on the order of 400 to 1000° F. under reducing conditions. The heat treated ore is then subjected to dissolution in a warm mother liquor saturated with sodium chloride. The reject from this dissolution operation contains the sodium chloride and the insolubles, including some of the clay the resulting solution carries with it. The rest of the clay is then separated by settling in thickeners and by filtration. The resulting solution then undergoes cooling whereby the desired potassium chloride crystals are formed.

Other modes of applying the principle of the invention may be employed, change being made as regards the details described, provided the features stated in any of the following claims or the equivalent of such be employed.

I, therefore, particularly point out and claim as my invention:

1. The method of treating sylvinite ores containing slime-forming clay to render said clay hard and non-dispersible which comprises heating said ore at a temperature of from about 400 to about 1000° F. under reducing conditions and then separating the clay from the ore values.

2. The method of treating sylvinite ores containing slime-forming clays to render said clay hard and non-dispersible which comprises first crushing the ore and then passing the crushed ore into direct contact with a reducing flame for a time period sufficient to heat said ore to a temperature of from about 400 to about 1000° F.

3. In the wet processing of sylvinite ore for extraction of potassium chloride values therefrom, said ores carrying slime-forming clays, the steps of first crushing said ore, heating the ore to a temperature of from about 400 to about 1000° F. under reducing conditions, and then extracting the potassium chloride values and separating the deslimed clay by wet processing.

4. In the wet processing of sylvinite ores for extraction of potassium chloride values therefrom, said ores carrying slime-forming clays, the steps of first crushing the ore, then passing the ore into direct contact with a reducing flame, the ore remaining in contact with said flame for a period sufficient to heat said ore to a temperature of from about 400 to 1000° F., and then extracting the potassium chloride values and separating the deslimed clay by wet processing.

References Cited in the file of this patent

UNITED STATES PATENTS

| | | |
|---|---|---|
| 1,174,464 | Agnew | Mar. 7, 1916 |
| 2,650,084 | White | Aug. 25, 1953 |
| 2,788,257 | Duke | Apr. 9, 1957 |